United States Patent [19]

Heiserman

[11] Patent Number: 4,610,475

[45] Date of Patent: Sep. 9, 1986

[54] PIEZOELECTRIC POLYMER MICROMANIPULATOR

[75] Inventor: David L. Heiserman, Columbus, Ohio

[73] Assignee: Microflex Technology, Inc., Columbus, Ohio

[21] Appl. No.: 647,722

[22] Filed: Sep. 6, 1984

[51] Int. Cl.$^4$ .............................................. B25J 15/12
[52] U.S. Cl. ...................... 294/86.4; 294/93; 294/99.1; 310/332; 310/800; 901/36
[58] Field of Search ...................... 294/1.1, 86.4, 86.1, 294/88, 93, 99.1, 99.2, 103.1, 906; 310/25, 330-332, 370, 800; 901/30, 31, 36, 38, 50

[56] References Cited

U.S. PATENT DOCUMENTS

| 3,835,338 | 9/1974 | Martin | 310/331 |
| 4,342,936 | 8/1982 | Marcus et al. | 310/800 X |
| 4,400,642 | 8/1983 | Kiraly | 310/332 |

FOREIGN PATENT DOCUMENTS

| 862174 | 3/1961 | United Kingdom | 901/36 |
| 773715 | 10/1980 | U.S.S.R. | 310/370 |
| 867647 | 9/1981 | U.S.S.R. | 901/38 |

Primary Examiner—Johnny D. Cherry
Attorney, Agent, or Firm—Frank H. Foster

[57] ABSTRACT

A gripping apparatus for gripping and releasing objects and for use with a micromanipulator. Spaced cantilever jaws extending in substantially the same direction from a support are each formed of a pair of elongated ribbons of piezoelectric polymer bonded together in oppositely polarized orientation. An electrically conductive thin film is bonded to the outer surfaces of the laminate. A voltage is applied to the conductive films causing the polymer ribbon laminates to bend toward or away from each other dependent upon the polarity of the applied voltage so that they grip an object.

12 Claims, 7 Drawing Figures

PIEZOELECTRIC POLYMER MICROMANIPULATOR

FIELD OF THE INVENTION

This invention relates generally to mechanized tools for handling parts and materials in the fabrication of products and more particularly relates to a grasping manipulator for use in microfabrication and assembly and other grasping and manipulating of very small parts and materials. A micromanipulator embodying the present invention is also useful in medical applications, such as microscopic surgery and in scientific experiments in which remote control of a manipulator is needed, such as the manipulation of small biological samples or radioactive materials.

BACKGROUND ART

Remotely controlled manipulators are used for grasping, moving and positioning a variety of objects from a remote position. The manipulator may be manually controlled or controlled by a machine, such as modern data processing apparatus. Such manipulators are used, for example, in modern robot aided manufacturing and assembly procedures and in handling dangerous materials. Typically, the manipulators are mechanical devices utilizing levers, pivots, gears and other mechanical structure to provide a variety of gripping structures referred to in this patent collectively as jaws. Because they are mechanical devices, such manipulators require lubrication and cleaning and are subject to wear.

Wherever the manufacturing process, such as the manufacture of electronic equipment, requires the manipulation of very small parts, the mechanical manipulators are particularly expensive because they require the shaping, machining and assembly of extremely small components. These manipulators therefore have a tendency to be more expensive, complicated and difficult to manufacture, assemble and maintain than is desirable.

Additionally, there is a practical limit to the miniaturization of mechanical structures. These size limitations on the manufacture of mechanical manipulators limit the size of the parts which they are able to handle.

There is, therefore, a need for a manipulator which is considerably more simple and inexpensive to manufacture and assemble and is easily operated and controlled without the extensive maintenance requirements of mechanical manipulators and which can be used for the manipulator of even smaller parts.

Electrically stimulated piezoelectric polymers have been used in the past in a vibrating mode in audio speakers and headphones. In such devices two layers of piezoelectric polymer are bonded together and are mechanically linked to a diaphragm. They are driven by an audio signal voltage.

BRIEF SUMMARY OF THE INVENTION

In the present invention at least one of the two or more jaw members of a manipulator comprises a piezoelectric polymer and a means for applying an electric field to the polymer and for controlling the field. Preferably, each of the jaws comprises a pair of elongated ribbons of piezoelectric polymer bonded together along interfacing major surfaces and in oppositely polarized orientations to form a cantilever. An electrically conductive film is bonded to the outwardly facing major surfaces of each laminated cantilever and a voltage source is connected to the conductive films of each jaw for applying a potential across them to create the electric field. The application of a voltage source to the conductive films causes the cantilevers to bend toward or away from each other to grip a small object.

Embodiments of the invention may be used to provide a gripping manipulator in a microscopic environment. The gripper may be equipped with a television system and so equipped can be used in clean room microassembly fabrication, the vacuum chambers of electron microscopes and with biological samples in experiments conducted on orbiting satellites, all by remote control. With the appropriate tools, embodiments of the invention may also be used for microscopic welding and surgical applications, although the concepts of the present invention are not intended to be limited to microscopic and miniature environments.

Figure 1:
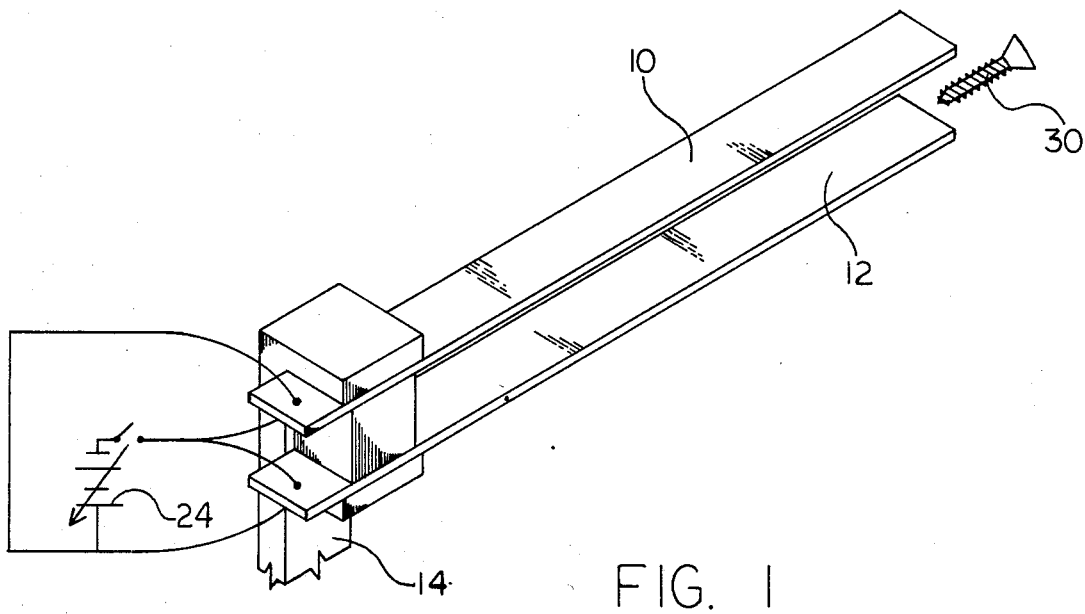
FIG. 1 is a view in perspective illustrating a preferred embodiment of the invention in its relaxed and released position.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

A variety of polymers can be made to exhibit piezoelectric properties and others will become known in the future as a result of research. The preferred material utilized in embodiments of the present invention is polyvinylidene difluoride. Although this material is available from several manufacturers, one manufacturer sells it under the trademark Kynar. The piezoelectric polymers which are chosen require suitable mechanical, piezoelectric and thermal properties. They must be sufficiently strong and durable, be able to withstand the temperatures of the environment in which they must work and must be easily fabricated into the geometrical configurations which are required. Piezoelectric polymers are described by M. Toda in Transactions IECE Of Japan, 61, and 7 (1978). A brief summary of their preparation and operation is useful.

Although the characteristics of piezoelectric polymers have been previously described in the prior art, a polymer which is capable of exhibiting piezoelectric properties is prepared by stretching it to form a film while simultaneously subjecting it to an electric field. The electric field is oriented transversely through the major surfaces of the film. This causes an average net rotation of molecular dipoles within the material with the dipoles being rotated toward alignment with the electric field.

Thereafter, when a sheet of this material is subjected to an electric field transversely and preferably perpendicularly through its major surfaces, the dipoles tend to be rotated. This rotation causes a strain to occur principally along the stretch direction. If the later field which is used to control the strain is in the same direction as the field utilized to initially align the dipoles, then the material is shortened. If the field is opposed to the initial poling field, then it is opposed to the existing dipoles and causes an elongation strain in the direction of stretch.

The controlling electric field may be most conveniently applied by forming a conductive film on each of the exposed, opposite major surfaces of the piezoelectric polymer. This is conveniently done by depositing a metalized surface of nickel or aluminum, for example, on those major surfaces. If the film is purchased with metalized surfaces, two ribbons of film may be bonded together with the metalized surfaces still on both major surfaces of each ribbon. The outer two metalized layers are the electrodes while the interior, bonded surface layers are inactive. Since they are preferably not ferromagnetic, they do not effect the electric field.

Figure 2:
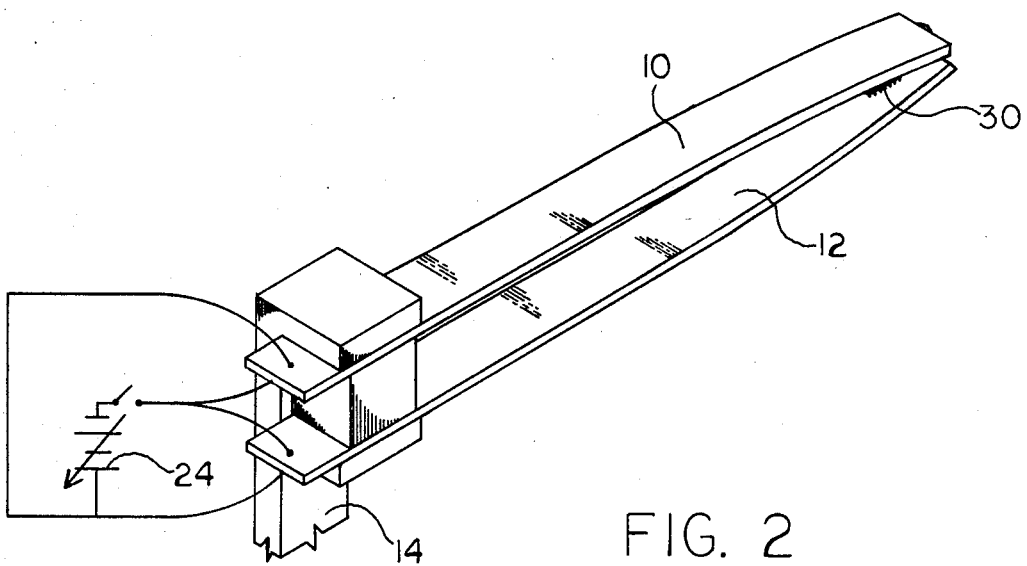
FIG. 2 is a view in perspective of the embodiment of the invention illustrated in FIG. 1, but operated for grasping a small part.
Figure 3:
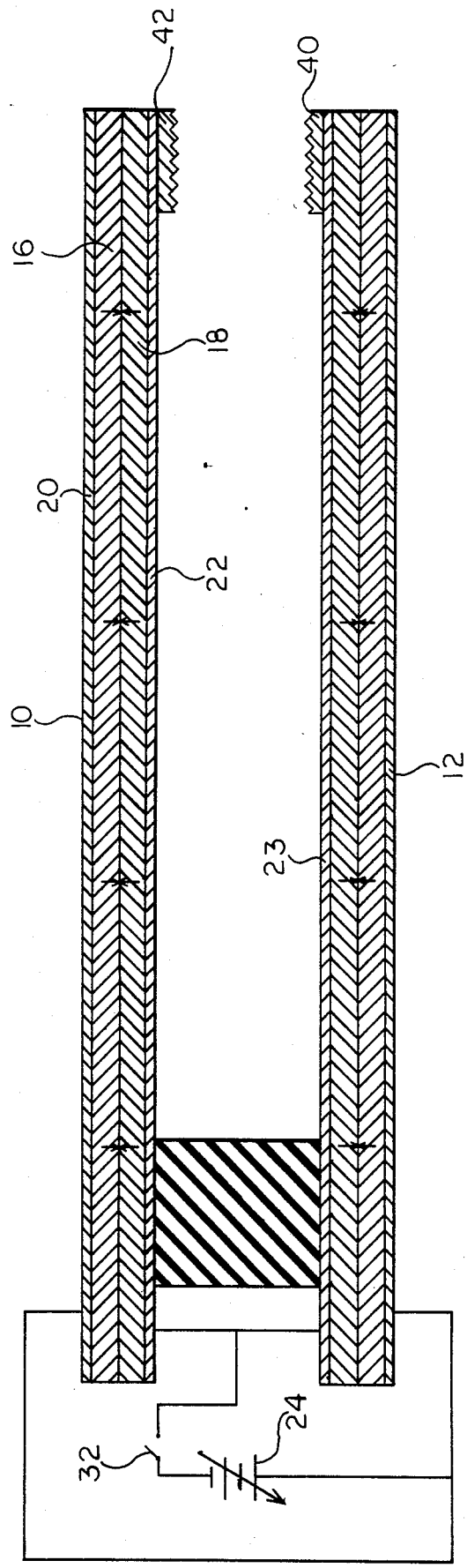
FIG. 3 is a view in vertical section of the embodiment of FIG. 1 with disproportionately enlarged dimensions to illustrate the component parts of the embodiment of FIG. 1.

FIGS. 1, 2 and 3 illustrate a preferred embodiment of the invention. This preferred embodiment comprises a pair of jaw members 10 and 12 which are mounted to a support 14. Preferably, both of the jaws comprise flexible cantilevers formed of ribbons of piezoelectric polymers. The cantilevers are elongated in the "stretch" direction of the polymer and extend from the support 14 in substantially the same direction. They are spaced from each other and each cantilever has a major surface facing a major surface of the other.

Referring to FIG. 3 and jaw 10 for example, each of the cantilever jaw members preferably comprises a laminate which is a pair of piezoelectric polymer ribbons 16 and 18 which are bonded together along their longitudinally extending interfacing major surfaces. Preferably, as indicated by the direction of the small arrows, they are oriented so that their dipoles are oppositely polarized. Although not necessary, they may for some applications have different piezoelectric coefficients.

Electrically conductive films 20 and 22, are bonded to the outwardly facing major surfaces of the piezoelectric polymer ribbons 16 and 18. The polymers may be metalized by depositing thin films of metal on their exposed major surfaces by standard metalization techniques. These conductive surfaces are connected by electrical conductors to a variable voltage source 24. The conductive surfaces together with the variable voltage source and connections between them provide a means for applying an electric field to the piezoelectric polymers and for controlling that field. Although a simple on/off control may be used, preferably, in some applications, the control may also vary the magnitude of the potential and therefore the electric field and may also permit polarity reversal.

In the operation of the embodiment illustrated in FIGS. 1-3, application of a voltage of the polarity illustrated causes a strain in the piezoelectric polymer ribbons. Each ribbon which has its dipoles in the polarity of the applied electric field will shorten in length while each ribbon with its dipoles opposite to the applied electric field will lengthen. This will cause each of the cantilever jaws illustrated in FIG. 3 to bend toward each other so that they may grip an object, such as the small object 30 illustrated in FIGS. 1 and 2. Upon removal of the electric field by opening the switch 32 the cantilever jaws will relax back to the position illustrated in FIGS. 1 and 3.

The cantilever jaws are conveniently made to bend toward each other, when the interfacing central conductive layers 22 and 23 are in contact with the same battery electrode, by orienting the jaws so that their piezoelectric polymer ribbons which face each other are oppositely polarized. Of course, one of the two cantilever jaws could be inverted and the electrical connections maintained the same to provide identical operation.

The jaws of each gripper can be provided with a suitable tool formed, for example, in the embodiment of FIGS. 1-3 at the end of the cantilevers. FIG. 3 illustrates a pair of pads 42 and 44 having centrally facing serrated surfaces for gripping a workpiece. The tools may be of any material and configuration which is suitable and known in the art for gripping a workpiece.

Embodiments of the invention may be formulated with a variety of alternative structures. For example, a gripping and releasing structure may be formed in which only one of the jaws is constructed of piezoelectric polymers while the other is merely a passive jaw but is positioned as illustrated in FIGS. 1-3. In such a gripper, the active piezoelectric polymer cantilever moves towrd and away from the passive jaw in response to the electric field applied to it.

The jaw members formed in accordance with the present invention may be formed in a variety of configurations, each of which is suitable for the particular environment in which it is to operate and for its particular task.

Figure 4:
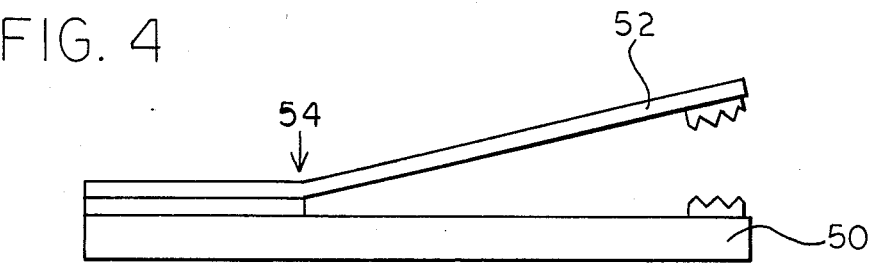
FIGS. 4, 5 and 6 illustrate alternative embodiments of the invention.

For example, FIG. 4 illustrates a gripper which has a passive cantilever jaw member 50 and a piezoelectric polymeric jaw member 52 which is identical to the jaw member 10 of FIG. 3, except that it is predistorted with a bend 54 so that, when no electric field is applied to it, it relaxes to the position illustrated in FIG. 4. Application of a voltage of the appropriate polarity to its conductive layers will cause the jaw to close upon an object positioned between the jaw member 50 and the jaw member 52.

Figure 5:
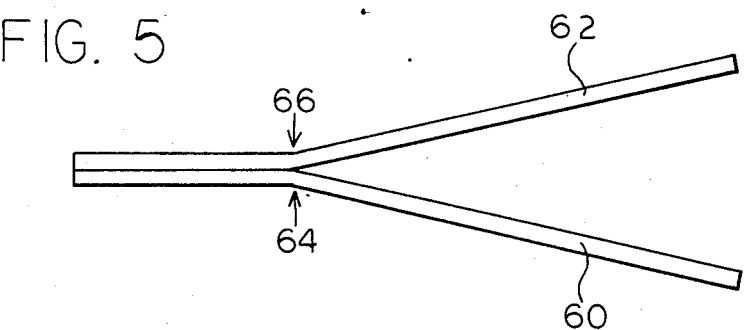

In the embodiment of FIG. 5 there are two active piezoelectric polymeric jaw members 60 and 62 which are identical to those of FIG. 3, except that both are provided with a bend, 64 and 66, so that the resulting gripper is Y or yoke-shaped.

Figure 6:
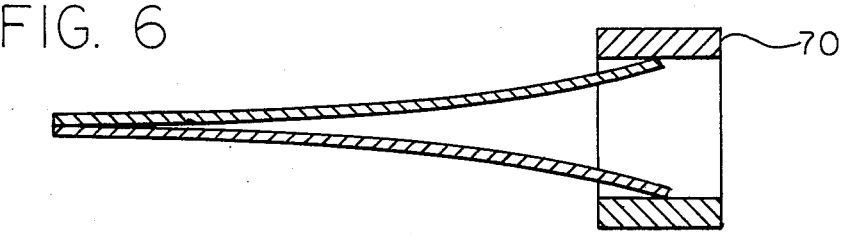

FIG. 6 illustrates yet another alternative embodiment in which the cantilever jaw members are substantially identical to the jaw members of FIG. 3, except that a voltage of the opposite polarity is applied so that the jaw members move apart upon application of the voltage to grip the inside of a workpiece 70.

Jaw members may be formed with ribbons which have a tapered or otherwise varying thickness so that, when they are bonded together, they have a varying curvature along their length.

Since application of the field causes a strain in the longitudinal direction of the ribbon, a gripper may also be formed using single layer piezoelectric polymers and not having a bending movement. The single layer pieces are arranged in line so that they extend toward each other with a gap between them. Upon application of an electric field the pieces elongate toward each other to grip an object positioned in the gap.

Thus, it should be apparent that in the broadest sense of the invention, a piezoelectric polymer member is subjected to an electric field causing it to physically move either toward or away from another member. This movement with respect to another member can be utilized to grip the inside or outside of a workpiece. Most desirably, all of the members may be piezoelectric polymers so both will move in order to increase the total movement distance of the jaw members.

Figure 7:
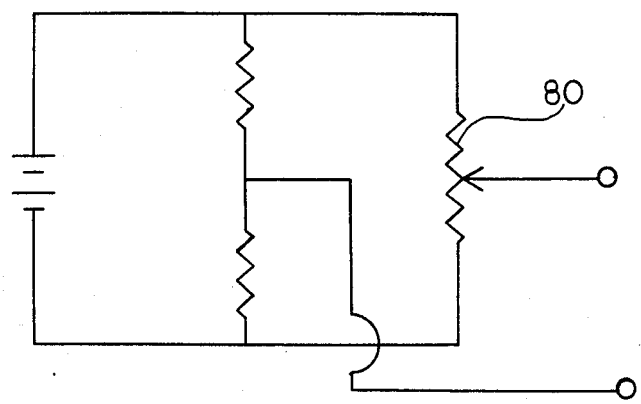
FIG. 7 is a schematic diagram of a simple power supply circuit for controlling the magnitude and polarity of the electric field for the present invention.

FIG. 7 illustrates a simple bridge circuit which may advantageously be used to provide the voltage to embodiments of the present invention. It has the advantage that movement of the potentiometer 80 permits the magnitude and the polarity of the applied electric field to be varied.

In addition, cantilever jaw members or jaw members of other types and configurations may be formed of a laminate of several layers of piezoelectric polymers. In addition the layers of a multilayer jaw may have differing piezoelectric constants.

Engineering

The equation for calculating the elongation of a single layer of piezoelectric polymeric material formed in a ribbon, as described above, is:

$$\Delta L = d_{31} V L / t \qquad \text{I}$$

wherein
- $d_{31}$ = the piezoelectric strain constant
- $V$ = applied voltage
- $L$ = Length
- $t$ = thickness of ribbon
- $\Delta L$ = change in length The force applied by the strain of the above relationship is:

$$F = Y d_{31} w V \qquad \text{II}$$

wherein
- $Y$ = Young's modulus
- $w$ = width
- other variables are as above

The lateral displacement of a single cantilever jaw member, such as jaw member 10 illustrated in FIG. 3, is given by the equation:

$$D = 3 d_{31} L^2 v / 4 t^2 \qquad \text{III}$$

Where two cantilever jaw members are utilized, as illustrated in FIG. 3, the total distance change between the two at the tips is twice the above distance.

The force applied by a single jaw member of the type illustrated in FIG. 3 is:

$$F = 3 Y d_{31} w t V / 2 L \qquad \text{IV}$$

EXAMPLE

An experimental example of the embodiment illustrated in FIG. 3 was constructed. The length of each jaw member was 20 mm and its width was 5 mm. Each ribbon was 28 microns thick. A voltage of 40 volts was applied. Each jaw member exhibited a tip displacement of about 0.35 mm and a predicted force of 1.9 mg.

While certain preferred embodiments of the present invention have been disclosed in detail, it is to be understood that various modifications in its structure may be adopted without departing from the spirit of the invention or scope of the following claims.

I claim:

1. An apparatus for grasping and releasing an object, the apparatus comprising at least two jaw members mounted to a support, at least one of the jaw members comprising a piezoelectric polymer and having means for applying an electric field to the piezoelectric polymer and for controlling said field whereby changes in the field cause changes in the mechanical strain of the polymer to move a portion of the polymer with respect to the other jaw member and thereby provide a gripping and releasing movement.

2. An apparatus in accordance with claim 1 wherein each piezoelectric polymer jaw member is a cantilever which is elongated in the "stretch" direction of the polymer and the field is applied transverse to the longitudinal axis of the cantilever.

3. An apparatus in accordance with claim 2 wherein each piezoelectric polymer cantilever has a width dimension and a thickness dimension both transverse to its elongated length dimension, the thickness dimension being substantially smaller than its width dimension and wherein the electric field is applied across the thickness dimension.

4. An apparatus in accordance with claim 3 wherein each cantilever comprises a pair of piezoelectric polymer ribbons which are bonded together along a longitudinal interfacing major surface of each.

5. An apparatus in accordance with claim 4 wherein said bonded ribbons are oppositely polarized.

6. An apparatus in accordance with claim 4 wherein each said pair of bonded ribbons have different piezoelectric coefficients.

7. An apparatus in accordance with claim 4 wherein each of said jaw members is a cantilever in accordance with claim 4.

8. An apparatus in accordance with claim 7 wherein said jaw members extend from the support in substantially the same direction and are spaced from each other with a major surface of each facing each other.

9. An apparatus in accordance with claim 8 wherein the means for applying and controlling the electric field is variable including means for varying the electric field intensity.

10. An apparatus in accordance with claim 9 wherein the means for applying and controlling the electric field permits changing the polarity of the electric field.

11. An apparatus for gripping and releasing objects, the apparatus comprising:
 (a) spaced cantilever jaws extending in substantially the same direction from a support, each jaw comprising
  (i) a pair of elongated ribbons of piezoelectric polymer bonded together along opposed major surfaces in oppositely polarized orientation; and
  (ii) an electrically conductive film bonded to the outwardly facing major surfaces; and
 (b) a voltage source controllably connected to said conductive films for applying a potential across the conductive films of each jaw.

12. An apparatus in accordance with claim 11 wherein the piezoelectric polymer ribbons of each jaw which face the other jaw are oppositely polarized.

* * * * *